(12) United States Patent
Dai et al.

(10) Patent No.: US 8,289,955 B2
(45) Date of Patent: Oct. 16, 2012

(54) ROBOT CONTROL SYSTEM

(75) Inventors: Fan Dai, Zwingenberg (DE); Joachim Unger, Mannheim (DE); Thomas Groth, Vaesteras (SE)

(73) Assignee: ABB AG, Mannheim (DE)

( * ) Notice: Subject to any disclaimer, the term of this patent is extended or adjusted under 35 U.S.C. 154(b) by 52 days.

(21) Appl. No.: 12/282,417

(22) PCT Filed: Mar. 6, 2007

(86) PCT No.: PCT/EP2007/001895
§ 371 (c)(1),
(2), (4) Date: Sep. 10, 2008

(87) PCT Pub. No.: WO2007/107236
PCT Pub. Date: Sep. 27, 2007

(65) Prior Publication Data
US 2009/0052325 A1 Feb. 26, 2009

(30) Foreign Application Priority Data

Mar. 17, 2006 (EP) .................................. 06005480
Jun. 10, 2006 (EP) .................................. 06011998

(51) Int. Cl.
*H04L 12/66* (2006.01)
*H04J 3/16* (2006.01)
(52) U.S. Cl. ......... 370/352; 370/392; 370/401; 370/466
(58) Field of Classification Search .................. 370/352, 370/392, 401, 466
See application file for complete search history.

(56) References Cited

U.S. PATENT DOCUMENTS

| 6,104,696 | A | 8/2000 | Kadambi et al. |
| 7,539,175 | B2* | 5/2009 | White et al. ................... 370/350 |
| 2002/0064157 | A1 | 5/2002 | Krause |
| 2005/0201369 | A1* | 9/2005 | Horie ............................. 370/389 |
| 2006/0062200 | A1* | 3/2006 | Wang et al. .................... 370/352 |
| 2006/0126547 | A1* | 6/2006 | Puuskari et al. ............... 370/310 |

(Continued)

FOREIGN PATENT DOCUMENTS

DE 10058524 6/2002

(Continued)

OTHER PUBLICATIONS

Martin Buchwitz et al. "Das Netz ist die Steuerung Technologiesprung in der Steuerungsrechnik", Elektronik, Weka Fachzeitschrifenverlag, Poing, DE, vol. 48, No. 8, Apr. 20, 1999, p. 38, 51-52, 54, XP000902697.

(Continued)

*Primary Examiner* — Andrew Lee
(74) *Attorney, Agent, or Firm* — Leydig, Voit & Mayer, Ltd.

(57) ABSTRACT

A robot control system has a connection module for a data network and includes a filter module configured to read data out of a data flow of a data network. The filter module identifies real-time data in the data network and extracts the real-time data as required. In addition, a method for directing data traffic in real time between a data system based on real-time and a network includes the steps of monitoring a data flow in the network for defined data using a filter module in the data system, extracting the defined data from the network, identifying real-time data in the defined data using an identification characteristic, and relaying the real-time data to a first receiving module.

20 Claims, 1 Drawing Sheet

U.S. PATENT DOCUMENTS

| | | | |
|---|---|---|---|
| 2006/0174336 A1* | 8/2006 | Chen | 726/11 |
| 2006/0224811 A1* | 10/2006 | Sichner et al. | 710/306 |
| 2006/0239283 A1* | 10/2006 | Fitzgerald | 370/401 |
| 2009/0099576 A1* | 4/2009 | Wang et al. | 606/130 |
| 2009/0318945 A1* | 12/2009 | Yoshimine et al. | 606/169 |

FOREIGN PATENT DOCUMENTS

| | | |
|---|---|---|
| DE | 10147421 | 9/2002 |
| WO | WO-03027784 | 4/2003 |

OTHER PUBLICATIONS

F. Monteiro et al. "Teleoperating a Mobile Robot. A Solution Based on JAVA Language", Industrial Electronics, 1997, ISIE '97, Proceedings of the IEEE International Syposium on Guimaraes, Portugal Jul. 7-11, 1997, New York, NY, USA, IEEE, US, vol. 1, Jul. 7, 1997, pp. 263-267, XP0210265177.

* cited by examiner

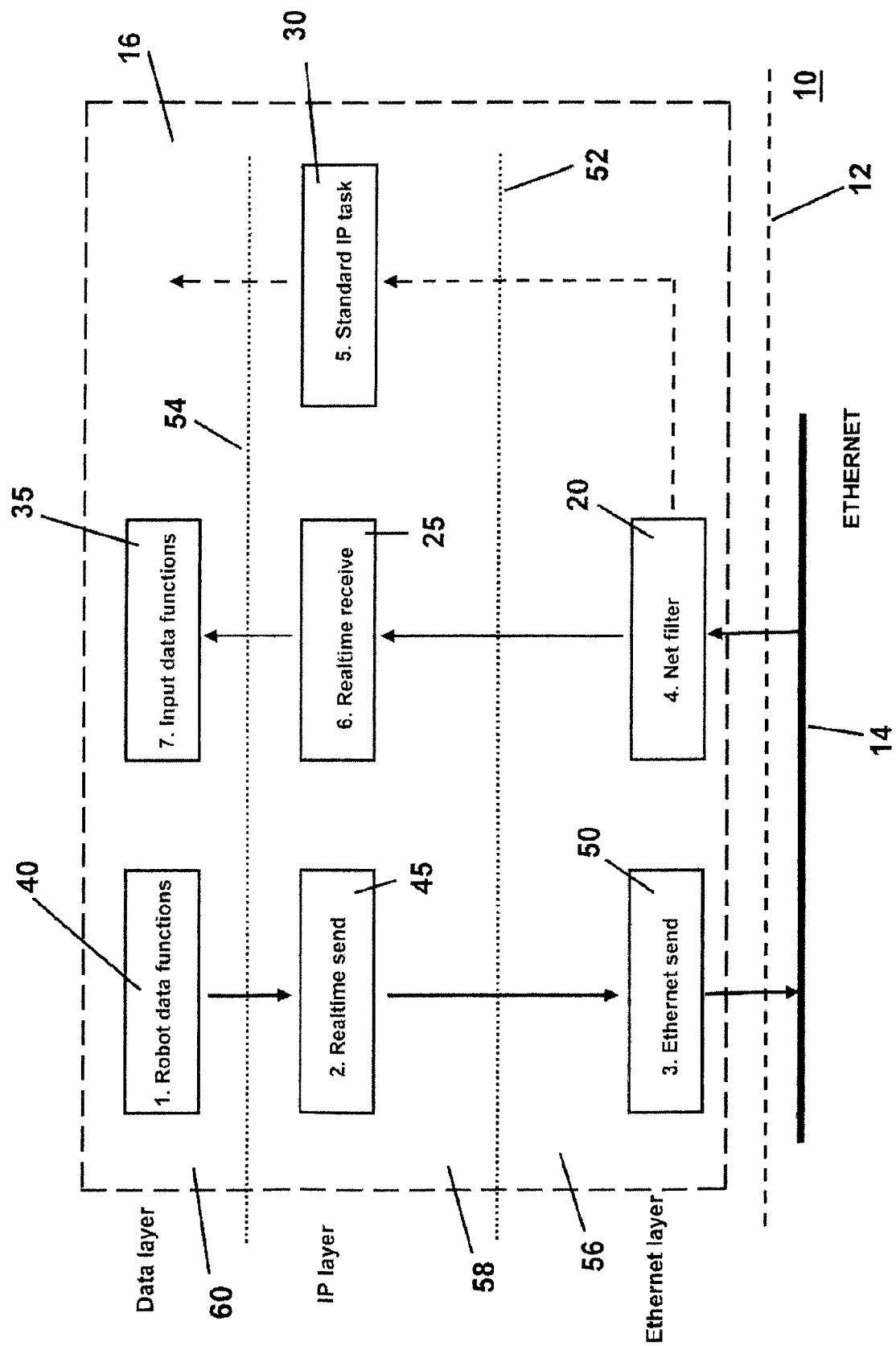

ROBOT CONTROL SYSTEM

This application is a U.S. National Phase application under 35 U.S.C. §371 of International Application No. PCT/EP2007/001895, filed on Mar. 6, 2007, which claims priority to European Patent Applications EP06005480.6, filed on Mar. 17, 2006, and EP06011998.9, filed on Jun. 10, 2006. The International Application was published in German on Sep. 27, 2007 as WO 2007/107236 under PCT Article 21(2).

The present invention relates to a robot control system designed as a real-time control system and including a connection module for a data network, defined data being able to be read out of a data flow of the data network by means of a filter module.

BACKGROUND

Robot control systems of this type are generally known. Robot control systems for industrial robots are conventionally real-time control systems in order to counter the potential risks of a robot by having high safety standards. It is also generally known that robot control systems are connected to networks, in particular local networks, which operate using standard protocols, such as TCP/IP, in order to exchange non-time-critical or general data with other computers via a superordinated control means for example. An example of data which reach the robot via a network of this type is the instructions for the robot to stop working after a particular future operating cycle or to start another cycle.

SUMMARY OF THE INVENTION

An object of the present invention is to provide a robot control system of the type mentioned at the outset and a method for data traffic in which data are exchanged in real time.

The robot control system according to the invention, configured as a real-time control system, is accordingly characterised in that real-time data can be identified in the data network and extracted as required.

Data networks which are conventionally connected to robot control systems are frequently based on a data protocol which does not transmit a data flow in real time, for example the standardised TCP/IP protocol. The filter module according to the invention makes it possible to identify the data in the data network which are considered to be real-time data for the robot control system. The filter module enables said real-time data to be extracted or read out from the data network.

Furthermore, it is provided according to the invention that the filter module is connected to a first receiving module for real-time data.

In this case, the robot control system therefore comprises a first receiving module which receives the data from the filter module and processes said data as real-time data. This ensures that the filter module only identifies the data in the data flow of the network, and the first receiving module receives the real-time data and optionally processes said data for use in real-time data functions of the robot control system. It is accordingly also provided that the first receiving module is connected to one or more real-time data function modules of the robot control system.

In an advantageous embodiment, the filter module comprises a further connection to a second receiving module for IP data.

In this configuration of the subject-matter of the invention, the real-time data are preferably sent as IP data (IP=Internet Protocol) within the data network and are correspondingly identified by the filter module. The filter module is in this case designed in such a way that it can differentiate as to whether the received data are real-time data or data for a standard IP function.

A feed module for real-time data makes it possible to send real-time data into the network in the robot control system according to the invention.

Particular robot functions supply real-time data so the robot control system obtains data of this type from corresponding robot functions. Should these data be transmitted in real time to another location via the network for whatever reason, it is also possible for this task to be carried out by the robot control system according to the invention.

In a particularly advantageous configuration of the subject-matter of the invention, the aforementioned modules are programs or program parts of the robot control system.

This provides the advantage that the subject-matter of the invention can be achieved with standardised input or output devices, such as an Ethernet card, by running the software. It has been found in this case that the filter module and the feed module are advantageously formed as a driver or driver program, and the first and second receiving modules are advantageously configured as program parts of the operating system of the robot control system.

A method according to the invention for data traffic in real time accordingly comprises the following steps:
  a data flow in the network in a data system is monitored for defined data by a filter module,
  the defined data are extracted from the network and real-time data in the defined data are identified by means of an identification characteristic and are relayed to a first receiving module.

Real-time data are therefore identified by the filter module and optionally extracted, in accordance with the protocol rules for the network. This type of real-time data is identified by means of an identification characteristic in such a way that the net filter can also process the data with a corresponding level of priority. This type of data is relayed directly to a first receiving module in such a way that the net filter advantageously carries out its identification task rapidly.

In an advantageous configuration, data identified by the net filter as non-real-time data are relayed to a second receiving module.

Data of this type may be, for example, information for particular program parts of the robot control system which are not subject to a real-time requirement and are referred to as standard IP tasks.

A further configuration of the method according to the invention provides that data in the network are transmitted a plurality of times faster than the data in the data system.

This ensures virtually error-free operation with the data flows between the robot control system and the network. The data volume, which is provided or is to be processed by the real-time control system, is thus substantially slower than the data flow which can be made available via the network. With appropriate selection of data buffers or other measures, it can thus be ensured that, in particular in the case of data from the network, there are always sufficient data for the robot control system for a real-time data flow to be provided on the real-time side of the filter module. If the network control system and the time conditions in the network are set for the robot control system, this enables the robot control system to operate overall in a real-time mode.

Further advantageous configurations of the subject-matter of the invention are to be inferred from the claims.

BRIEF DESCRIPTION OF THE DRAWING

The invention, the advantages thereof and further improvements of the invention will be explained and described in greater detail with reference to the embodiment shown in the drawing, in which:

FIG. 1 is a functional diagram of an interface between a robot control system and a data network.

DETAILED DESCRIPTION

FIG. 1 is a diagram 10 of an interface 12 between a data network 14 and a robot control system 16. In this case, the interface 12 is to be understood as a system boundary of the actual configuration of the robot control system 16, and as a network connection to the Ethernet 14, for example in the form of a plug connection. In the selected example, the Ethernet 14 operates with a data flow of 100 Mbit/s, and the robot control system 16 should operate with a data flow of 1 Kbit/4 ms. The Ethernet 14 also operates using a standardised protocol, i.e. the TCP/IP (Transmission Control Protocol/Internet Protocol). This type of network is widespread and is standardised to a large extent. In an operating mode of this type, data packets are sent through the Ethernet 14, the data packets containing, in addition to pure information data, protocol data which contain more details about the sender, the receiver or the data volume of the data packet, etc. This protocol data enable the devices connected to the network to identify whether a data packet is intended for said device. However, the packet form of the data means that the Ethernet 14 cannot be termed a real-time data network.

In contrast thereto, defined functions of a robot operate in real time, for example, all of the functions of the robot relating to operational safety, such as collision avoidance functions or movement functions in cases in which the movement of the robot deviates from the planned robot movement. In addition, a conventional robot has functions which do not necessarily have to be controlled in real time, for example control functions which do not directly affect the safety functions, such as information on the number of operating cycles to be carried out, and represents pure information which must be produced by the robot or transmitted by the robot to a central control station for statistical reasons. In this respect, it is known that robot control systems may have interfaces, a standard Ethernet card for example, which enable controlled data traffic to be achieved between the robot control system 16 and the Ethernet 14.

In the selected embodiment of the subject-matter of the invention, the robot control system comprises a net filter 20 which is connected to the Ethernet 14 via the interface 12. In this case, the net filter 20 monitors the data packets for those which are intended for the robot control system 16 and optionally reads them out of the Ethernet 14. The net filter 20 is also designed to examine the read-out data to determine whether said data are processed as real-time data or as normal data using the IP standard as the protocol standard. For this purpose, data which are to be processed as real-time data carry an additional identifier in such a way that it is particularly easy for the filter to carry out its task. If a data packet does not have any special identifiers, it is processed as a packet of "normal IP data". The net filter 20 is further connected to a real-time data receiver 25 and a standard IP data receiver 30. In this case, the task of the real-time data receiver 25 is to analyse the real-time data provided thereto to determine which data are contained and which functions of the robot control system 16 these data are intended for. This is indicated in the figure by a connection to an example robot data function 35, it being possible for said function to be a plurality or a large number of functions of the robot control system 16.

The method according to the invention for data traffic in real time between a data system based on real time and a local network is carried out as follows in the components of the robot control system described in greater detail above.

The Ethernet 14 is the local network which operates as a non-real-time network using a TCP/IP standard protocol. The net filter 20 is connected to the Ethernet 14 via the interface 12 and monitors the data packets for defined data which are intended for the robot control system 16. If data of this type are found, these defined data are also extracted from the network. Real-time data are recognised and identified by means of an identification characteristic contained in the data packet, a numeric code for example, and are relayed to the real-time data receiver 25 for further data processing. If the net filter 20 determines, however, that the data are intended for the robot control system 16 but do not contain any real-time data, the data packet is relayed to the standard data receiver 30. In this way, all of the incoming data intended for the robot control system 16 are relayed to the point provided therefor within the robot control system 16 for further processing.

The figure also contains a part of the diagram which shows how real-time data are processed and can be sent as real-time data to a device connected to the Ethernet 14 other than the robot control system 16. In this case, the real-time data are produced by particular data functions 40 of the robot, for example position data, status data or use data of the robot. These real-time transmission data are sent to a real-time transmitter 45, for which purpose the data functions are connected to said real-time transmitter. The real-time data transmitter 45 thus prepares the data to be sent into the internet. Said transmitter may have, for example, filter functions which reduce the data volume or remove data intended for transmission from the data packet. These functions may optionally also include preparing the data and optionally providing said data with further protocol data in such a way that a net transmitter 50 can be dedicated in particular to the task of transmitting the data packets in a suitable manner into the Ethernet 14 via the interface 12.

In order to show a favourable configuration of the robot control system 16 according to the invention, a first region boundary 52 and a second region boundary 54 are marked in the figure and divide the robot control system 16 into three region portions. The net filter 20 and the transmission device 50 are arranged in a first portion 56. These elements may be configured as components, but may also be programs or program parts of a data processing program. A preferred configuration involves providing these elements 20, 50 as what are known as drivers or driver programs.

A second region 58 contains the real-time data receiver 25, the standard data receiver 30 and the real-time data transmitter 45. These elements 30, 25, 45 may also advantageously be configured as programs or program parts, in particular modules of the operating system of the robot control system 16.

Finally, a third region 60 contains the symbols for the real-time data function 35 and the robot function 40. These symbols 35, 40 represent the functions of the robot. Examples of functions of the robot for receiving real-time data include control instructions for the individual motors or stepping motors of the axle drives of a robot. Real-time data produced by the robot include, for example, position data of the robot axes, status data of the drives, brakes, flows or signals in the robot, or tool data produced while the robot is moving, during a welding procedure, for example.

LIST OF REFERENCE NUMBERS

10 diagram
12 interface
14 data network/Ethernet
16 robot control system
20 net filter
25 real-time data receiver
30 standard data receiver
35 robot data functions/real-time data functions
40 data functions/robot functions
45 real-time transmitter
50 transmission device
52 first region boundary
54 second region boundary
56 first region portion
58 second region
60 third region

The invention claimed is:

1. A robot control system comprising:
a connection module for a local data network, the local data network operating using a non-real-time based protocol and configured to carry a flow or data containing real time data and non-real-time data, wherein the real time data include robot operational safety functions and the non-real-time data include robot control functions that do not directly affect the operational safety functions; and
a filter module configured to read the data out of the flow of data and to identify the real-time data in the data network and to extract the real-time data.

2. The robot control system as recited in claim 1, wherein the non-real-time-based protocol is a TCP/IP protocol.

3. The robot control system as recited in claim 1, further comprising a first receiving module connected to the filter module and configured to receive the real-time data.

4. The robot control system as recited in claim 3, further comprising at least one real-time data function module connected to the first receiving module.

5. The robot control system as recited in claim 3, further comprising a second receiving module for receiving the non-real-time data.

6. The robot control system as recited in claim 3, further comprising a feed module configured to send real-time data into the network.

7. The robot control system as recited in claim 6, further comprising a transmission module connected to the feed module.

8. The robot control system as recited in claim 7, further comprising at least one robot function configured to generate the real-time data.

9. The robot control system as recited in claim 7, wherein at least one of the filter module and the feed module is formed as software.

10. The robot control system as recited in claim 9, wherein the software is a driver.

11. The robot control system as recited in claim 7, wherein at least one of the first receiving module, the second receiving module and the transmission module is formed as software.

12. The robot control system as recited in claim 7, wherein the software is an operating system.

13. The robot control system as recited in claim 7, wherein at least one of the filter module, the feed module, the first receiving module, the second receiving module and the transmission module are disposed on an interface card.

14. The robot control system as recited in claim 13, wherein the interface card is an Ethernet card.

15. A method for directing data traffic in real-time between a robot control system for a robot based on real-time and a local network, the method comprising:
monitoring a data flow in the local network for defined data using a filter module in the robot control system, wherein the local network uses a non-real-time-based protocol and the defined data contain real-time data and non-real-time data, wherein the real time data include robot operational safety functions and the non-real-time data include robot control functions that do not directly affect the operational safety functions;
extracting the defined data from the local network;
identifying real-time data in the defined data using an identification characteristic;
relaying the real-time data to a first receiving module; and
moving the robot based on at least one of the robot operational safety functions and the robot control functions.

16. The method as recited in claim 15, further comprising identifying the non-real-time data and relaying the non-real-time data to a second receiving module.

17. The method as recited in claim 15, further comprising relaying the real-time data by the first receiving module to at least one real-time data function module.

18. The method as recited in claim 15, further comprising feeding output data in real time into the network using a feed module.

19. The method as recited in claim 18, wherein the output data are provided in real time to the feed module by at least one robot function.

20. The method as recited in claim 15, wherein data in the network are transmitted faster than are the data in the robot control system.

* * * * *